US010576016B2

(12) United States Patent
Eda et al.

(10) Patent No.: US 10,576,016 B2
(45) Date of Patent: Mar. 3, 2020

(54) METHODS AND SYSTEMS FOR MANAGING PHOTOGRAPHIC CAPTURE

(71) Applicant: INTERNATIONAL BUSINESS MACHINES CORPORATION, Armonk, NY (US)

(72) Inventors: Sasikanth Eda, Vijayawada (IN); Deepak Ghuge, Sangamner (IN); Abhishek Jain, Baraut (IN); Sandeep Patil, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/825,208

(22) Filed: Nov. 29, 2017

(65) Prior Publication Data
US 2019/0159966 A1    May 30, 2019

(51) Int. Cl.
*A61H 99/00* (2006.01)
*G01B 9/00* (2006.01)
*H04N 5/232* (2006.01)

(52) U.S. Cl.
CPC ............ *A61H 99/00* (2013.01); *G01B 9/00* (2013.01); *H04N 5/232* (2013.01); *A61H 2230/625* (2013.01)

(58) Field of Classification Search
CPC ..... A61H 99/00; A61H 2230/625; G01B 9/00
See application file for complete search history.

(56) References Cited

U.S. PATENT DOCUMENTS

| 8,164,644 | B2* | 4/2012 | Lee | H04N 5/23219 348/222.1 |
| 9,936,902 | B2* | 4/2018 | Bhushan | A61B 5/11 |
| 2007/0149360 | A1* | 6/2007 | Narayanaswami | A63B 24/00 482/8 |
| 2009/0304267 | A1* | 12/2009 | Tapley | G06K 9/4652 382/156 |
| 2012/0265104 | A1* | 10/2012 | Menegon | G06K 9/00342 600/595 |
| 2014/0247325 | A1* | 9/2014 | Wu | H04N 5/23206 348/39 |
| 2015/0178461 | A1* | 6/2015 | Kozloski | G06Q 10/1095 705/4 |
| 2015/0365545 | A1* | 12/2015 | Wu | H04N 5/23219 348/222.1 |
| 2018/0014754 | A1* | 1/2018 | Gray | A61B 5/1036 |

OTHER PUBLICATIONS

Anonymous, "Method and System for Recommending a Photographic Pose to a User," An IP.com Prior Art Database Technical Disclosure, IP.com No. IPCOM000246020D, Apr. 26, 2016 (3 pages).
Fu et al., "Data-driven Suggestions for Portrait Posing," Proceedings in SA '13 SIGGRAPH Asia 2013 Technical Briefs ACM Digital Library, 2013 (4 pages).

* cited by examiner

*Primary Examiner* — Richard A Hansell, Jr.
(74) *Attorney, Agent, or Firm* — Griffiths & Seaton PLLC (57) ABSTRACT

Embodiments for managing photographic capture by one or more processors are described. An image is received. The image includes at least one individual and is associated with a location. A signal indicative of a recommendation with respect to a posture of the at least one individual in the image is generated based on information associated with the at least one individual, the location, or a combination thereof.

18 Claims, 9 Drawing Sheets

FIG. 10

METHODS AND SYSTEMS FOR MANAGING PHOTOGRAPHIC CAPTURE

BACKGROUND OF THE INVENTION

Field of the Invention

The present invention relates in general to computing systems, and more particularly, to various embodiments for managing photographic capture.

Description of the Related Art

Due to the rapid growth of technology, digital cameras, such as those typically found in modern mobile (or smart) phones, are now considered nearly a necessity by some people, as photos are widely used as visualization aids in understanding data and to provoke human emotions. These cameras are now capable of generated quality, high resolution such that many people want to capture nearly every moment of their life, and photography has arguably been changed from a highly skilled profession to an easily-practiced hobby.

At the same time, social media platforms have had a significant impact on modern culture, business, and on the world in general, as "convergence" is now seemingly everywhere. As such, many photographs taken using modern digital cameras are intended to be viewed by as many of the user's contacts/connections as possible. As such, it is often desirable for the individual to be relatively easy to see and/or recognizable in the photograph.

SUMMARY OF THE INVENTION

Various embodiments for managing photographic capture by one or more processors are described. In one embodiment, by way of example only, a method for managing photographic capture, again by one or more processors, is provided. An image is received. The image includes at least one individual and is associated with a location. A signal indicative of a recommendation with respect to a posture of the at least one individual in the image is generated based on information associated with the at least one individual, the location, or a combination thereof.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, due to the rapid growth of technology, digital cameras, such as those typically found in current mobile (or smart) phones, are now considered nearly a necessity by some people, as photos are widely used as visualization aids in understanding data and to provoke human emotions. Due to the advent of various social media platforms in recent years, an intended use of the photographs taken by digital cameras is to upload them on a user's social media profile to be distributed so that other people may see them by, for example, posting the images on his/her social media profile and/or "sharing" the images with other users (e.g., contacts, colleagues, etc.) and/or groups of users (e.g., groups related to particular interests, hobbies, professions, etc.).

In the minds of many users, ideally, the images are seen by as many people as possible and create a significant reaction (e.g., views, comments, reactions, etc. associated with the posted images). However, for various reasons, sometimes the images (and/or the user's presence in the images) seemingly goes relatively unnoticed by the intended audience (e.g., few people view the images and/or few comments/reactions are generated).

For example, consider a scenario in which a person takes a photograph, or is shown in a photograph taken by another individual, while the person is on vacation. If the person is wearing bland attire and/or is standing or sitting in a relatively "normal" or "conventional" posture or pose (e.g., standing with both arms hanging to his/her side), when the photograph is posted on a social media platform, other users may not notice the person's presence in the photograph, and as such, may not comment on and/or react to the photograph.

Similarly, if multiple people appear in the photograph, and the posture of the particular person is similar to that of the other people shown in the photograph, the presence of the user may be difficult for other people viewing the photograph to ascertain. Additionally, other people may simply find the photograph to be uninteresting because the similar postures of those shown in the photograph make the photograph monotonous.

Also, some viewers may find the photograph uninteresting if the particular person appears in the photograph in a manner that is typical for the person. That is, if the person typically appears in such photographs with his/her arms crossed or some other "normal" posture, other viewers may pass right over the photograph without providing any sort of reaction because the person's appearance in the photo is similar to that of other photographs (i.e., the other viewers may barely notice the photograph). Similarly, some postures may render the photograph unsuitable or inappropriate to be sent to/shared with some users on the social media platform. For example, a photograph that shows the person in a posture that may be considered offensive or obscene may not be suitable to share with other users in a professional group and/or family members, and if done so, may generate unfavorable reactions.

Another undesirable situation with respect to the posture (and/or overall appearance) of the person may arise in relation to the location at which the photograph is taken. For example, if the photograph is taken at a location with historical and/or emotional significance (e.g., a monument, a cemetery, etc.), if an inappropriate or obscene posture is used, some people who view the photograph may be offended.

In view of the foregoing, a need exists for methods and systems that analyze the posture(s) of individual(s) in captured images and provide recommendations for changing the posture(s) before a final image is captured.

To address these needs, the methods and systems of the present invention, for example, analyze received images (or photographs) to determine the posture of one or more individuals shown in the image. Based on, for example, information associated with the individual(s) (e.g., other images that include the individual) and/or information associated with the location at which the image is taken, a recommendation with respect to the posture of the one or more individuals (e.g., a recommendation to change from a first posture to a second posture) is generated. After the recommended action(s) are performed, a final image may be captured.

In particular, in some embodiments, a method for managing photographic capture by one or more processors is provided. An image is received. The image includes at least one individual and is associated with a location. A signal indicative of a recommendation with respect to a posture of the at least one individual in the image is generated based on information associated with the at least one individual, the location, or a combination thereof.

The recommendation may include a suggestion to change the posture of the at least one individual from a first posture to a second posture. The generating of the signal indicative of the recommendation may include comparing the posture of the at least one individual in the image to the postures of other individuals in other images associated with the location.

The at least one individual may include a plurality of individuals. The recommendation may include a recommended posture for each of the plurality of individuals. The recommended posture for each of the plurality of individuals may be different than the recommended postures for the others of the plurality of individuals.

The generating of the signal indicative of the recommendation may include determining a social nature of the at least one individual in the image based on the information associated with the at least one individual. The recommendation may include a recommended posture based on the determined social nature.

The at least one individual may include a plurality of individuals. The generating of the signal indicative of the recommendation may include comparing the posture of each of the plurality of individuals to the postures of the others of the plurality of individuals.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
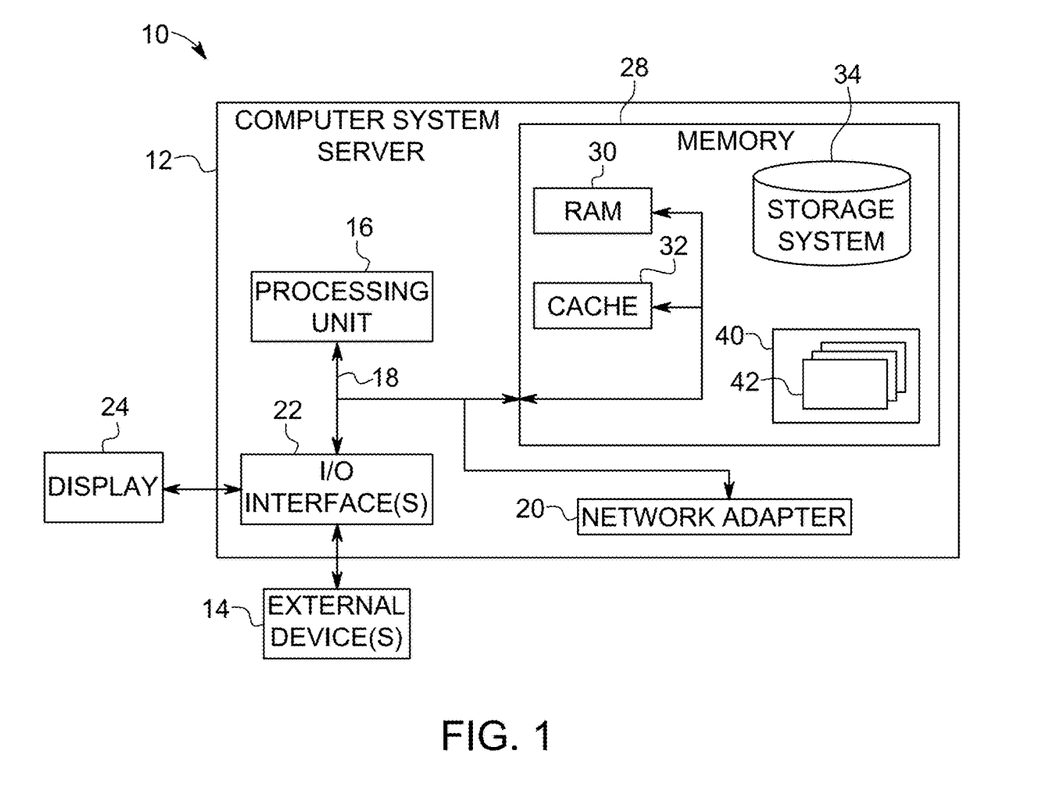
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, computing devices, such as personal computer systems, hand-held or laptop devices, and network PCs/servers, and/or various other devices, such as cameras (or computing devices that include cameras). For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
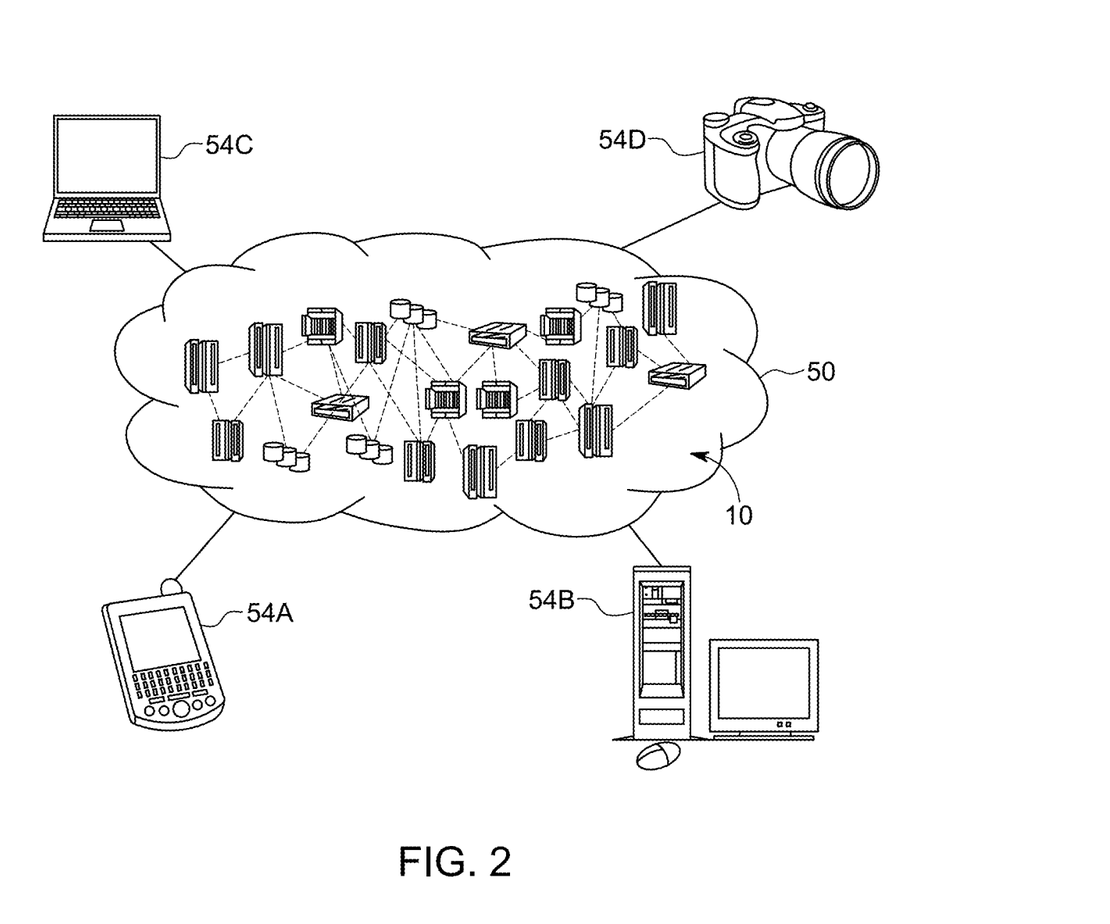
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or camera 54D.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-D shown in FIG. 2 are intended to be illustrative only and that computing nodes 10 and cloud computing environment 50 can communicate with any type of computerized device over any type of network and/or network addressable connection (e.g., using a web browser).

Figure 3:
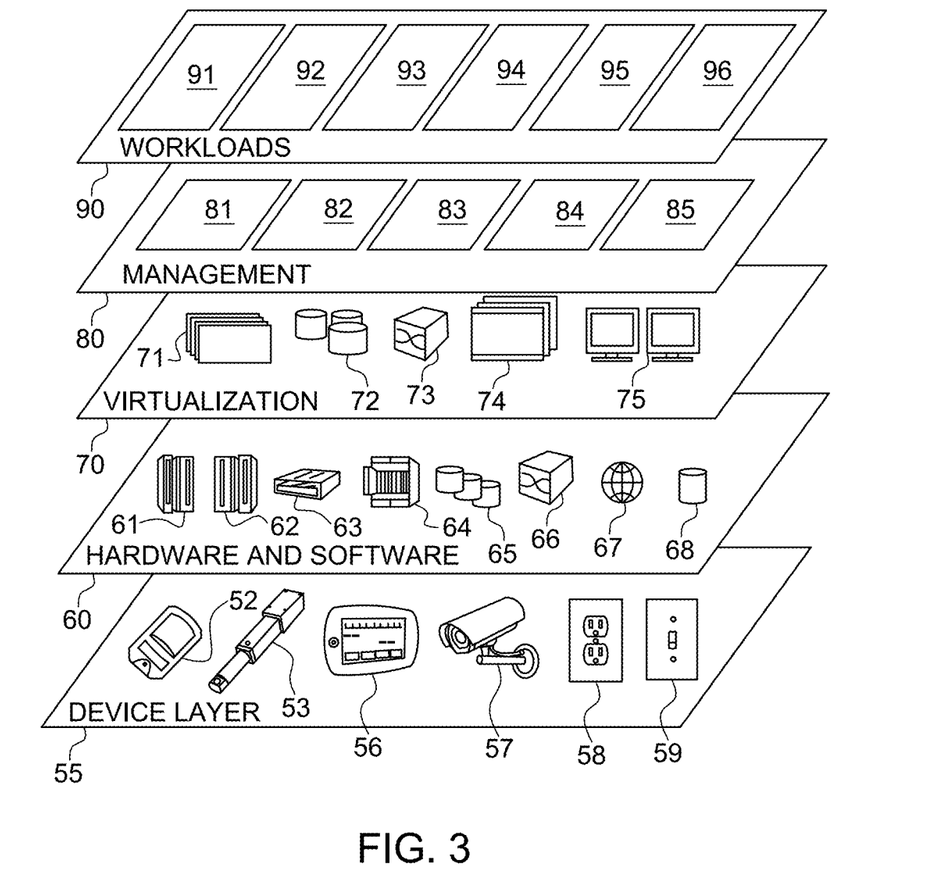
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, such as cameras, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing photographic capture as described herein. One of ordinary skill in the art will appreciate that the workloads and functions 96 for managing photographic capture may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for managing photographic capture, such as with respect to the appearance of individuals (e.g., people) in an image. In particular, in some embodiments, the "posture" (and/or overall appearance) of at least one individual in an "initial" image is detected, and based on various factors, a recommendation with respect to the posture (e.g., a recommended change in posture, a recommended posture, etc.) of the individual(s) is generated and provided. A "final" image may then be captured and/or saved.

For example, in some embodiments, an initial (or first) image is detected or captured by any suitable camera (or more generically, any suitable electromagnetic sensor), such as a "stand alone" digital camera or a camera on a more generic computing device, such as a cellular (or smart) phone, tablet, or other computing device. In some embodiments, the image includes at least one individual (or person) (i.e., at least one individual is visible in the image) and may be associated with a particular location (e.g., the image is/was taken at the location). The posture(s) of the individual(s) may then be analyzed and/or compared to the postures of individuals (e.g., the same people and/or other people) in other photos. Depending on the result of the analysis, a signal may be generated, which is indicative of a recommendation with respect to the posture(s) of the individual(s) in the image. For example, an electronic message or notification may be sent to at least some of the individuals in the image (e.g., via text message, email, pop-up message on his/her mobile device, etc.) that includes a recommended change to his/her posture (and/or overall appearance) in the image. In some embodiments, after the recommended changes are made, a final image is then captured (perhaps automatically/in response to detecting the recommended changes being made).

In some embodiments, the posture(s) of the individual(s) in the image is compared to the posture(s) of individual(s) in other images via a social media-like system or a social network. For example, at least some of the individuals in the image may be registered with a system that includes a social network in which users can post images and/or "share" images with their "contacts" (e.g., other users to which they are connected or linked) and/or "groups" (e.g., collections of users related to a particular subject, topic, organization, etc.). The analysis of the individual's posture may include comparing the posture to that of the individual, or other users, in other images posted in the social network.

However, the analysis may (also) include comparing the posture of each of the individuals in the image to the posture of other individuals in the image (i.e., regardless of whether or not the other individuals are registered as users). In some embodiments, the analysis (also) includes determining whether or not the posture is suitable/appropriate for the location at which the image is taken.

Figure 4:
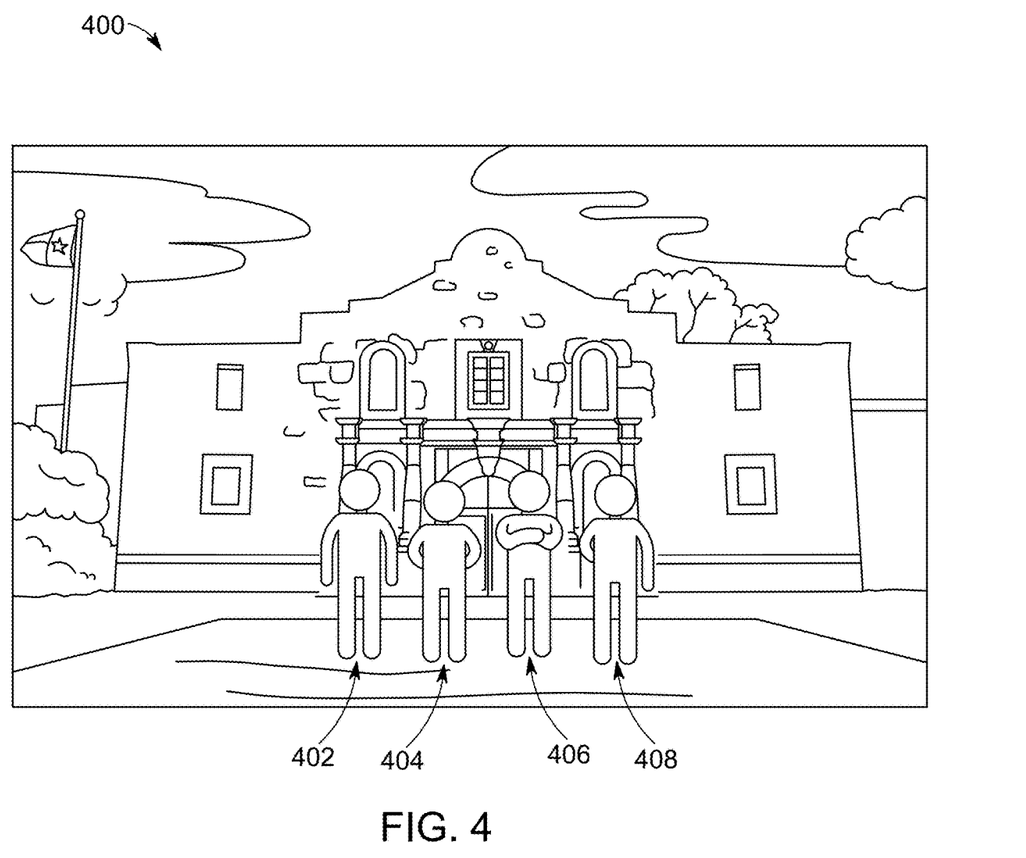
FIG. 4 is a plan view of an initial image captured by a camera, which includes several individuals, according to an embodiment of the present invention.

Referring to FIG. 4, an exemplary initial (or first) image 400 is shown, as it may be detected/captured by a camera, and perhaps rendered by a computing device (e.g., on a display screen of a mobile device). Generally, the initial image 400 shows (or includes) individuals (or people) 402-408 standing in front of a building, with various other objects and scenery in the background. It should be understood that this particular image (e.g., the number of people and/or types of objects in the image) is merely intended as an example used to set forth various aspects of functionality of embodiments of the present invention. In some embodiments, after being captured, the initial image 400 is analyzed by, for example, determining the postures of at least some of the individuals 402-408 in the image and comparing them to the postures of individuals (e.g., individuals 402-408 or other people) in other images. In some embodiments, at least some of the individuals 402-408 have previously been registered as users to receive the recommendation(s) with respect to posture as described below. The identification of the individuals 402-408 may be performed in any suitable manner, such as facial recognition, the presence/position of electronic devices (e.g., mobile devices of the individuals) relative to the camera that has captured the initial image 400, manual entry (e.g., via text or voice commands), etc.

Still referring to FIG. 4, as shown, the postures (the initial or first postures) of the individuals 402-408 may be considered to be relatively "normal" or "inconspicuous." That is, the postures include both arms on the side, both hands behind the back, arms crossed, etc. As will be appreciated by one skilled in the art, these postures may be recognized via image processing, object recognition, etc.

In some embodiments, the posture of at least some of the individuals 402-408 as shown in the initial image 400 is, for example, analyzed and/or compared to information associated with the individual(s) 402-408 and/or information associated with the location at which the image is taken in order to generate a recommendation with respect to the posture of the individual(s) (and/or generate a signal indicative/representative of the recommendation), as described in greater detail below.

In some embodiments, the recommendation(s) regarding the posture(s) of the individual(s) may be generated in order to ensure (or at least promote) at least one of the following: the individual(s) is noticeable in the image, the posture(s) of the individual(s) is at least somewhat unique compared to the postures of the other individuals in the image, the posture of the individual varies (or alternatively, is consistent with) the "social nature" of the individual, and the posture is appropriate considering the location at which the image is taken.

For example, if it is determined that the posture (and/or overall appearance) of an individual in the image is such that it is difficult to notice or recognize the individual in the image, the recommendation may be generated in order to make the individual more noticeable in the image. Consider a situation in which the particular individual is relatively far from the camera and/or is partially blocked from view (e.g., the individual is in the second or back row of people). In such an instance, the generated recommendation may call for the individual to move closer to the camera (e.g., move to the front row) and/or change his/her posture (e.g., change from having his/her arms down to waving at the camera).

In some embodiments, the determination of whether or not the individual is relatively noticeable in the image may include (automatically) identifying a primary focal point (or object) of the image, as will be appreciated by one skilled in the art. A "focal point score" for each of the (other) objects in the image may then be determined based on a comparison of the other objects and the primary object (e.g., based on apparent size, shape, lighting, colors, etc.). Such a method may be applied to the individual(s) in the image. In some embodiments, a threshold (e.g., 10%, 15%, etc. of the primary object) may be set, and if the focal point score associated with an individual is less than the threshold, it may be determined that the individual is relatively difficult to notice in the image. In some embodiments, other factors may (also) be used, such as shapes, writing, logos, etc. that appear on the clothing of the individual(s), the type of clothing worn by the individual (e.g., a costume), as well as information related to other users of the social media platform (e.g., comments, reactions, etc. associated with previous images).

If it is determined that the posture(s) of at least some of the individuals are relatively similar, the recommendation may be generated in order to vary the postures of the individuals. Consider a situation in which at least two individuals in the image have their arms folded. In such an instance, a recommendation may be sent to at least one of the individuals suggesting that he/she changes his/her posture (e.g., from arms folded to having both arms raised above his/her head).

In some embodiments, the recommendation is based on a determined "social nature" (or group nature) of the individual. For example, if the individual has previously posted images in a particular group of the social media platform described above, and it is determined that the individual typically poses for the images using "normal" postures (e.g., hands behind the back), the recommendation may call for the individual to change his/her posture to something that he/she has never (or rarely) used before in the previous posted images (e.g., hands above the head, forming a "Y"). However, the recommendation may instead call for the individual to change his/her posture to something that is more consistent with the other images. For example, if the individual often posts images within a professional group on the social media platform, and the detected posture is determined to be inappropriate for such a group, the recommendation may call for a more normal or professional posture to be used in the image.

Figure 5:
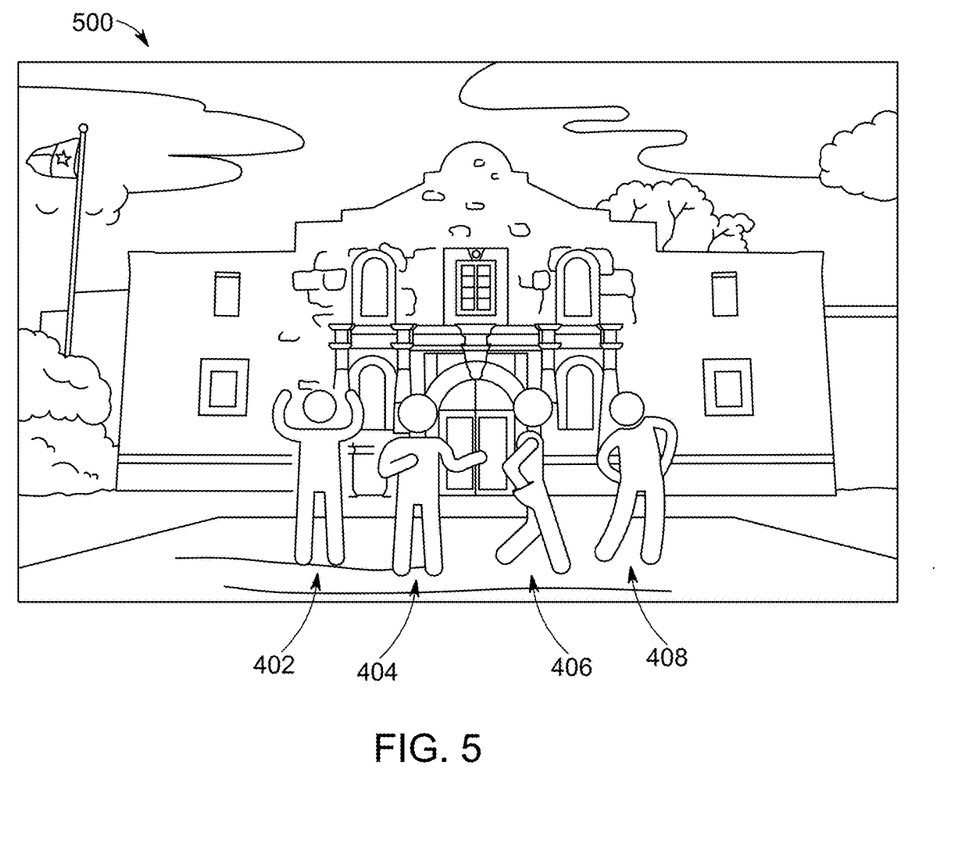
FIG. 5 is a plan view of a final image captured by a camera, after the postures of the individuals have been changed, according to an embodiment of the present invention.

As alluded to above, information associated with the location at which the image is taken may also be used in generating the recommendation. For example, if the image is determined (e.g., via GPS information and/or image analysis) to be taken at (or near) a location with historical significance (e.g., the Alamo, as shown in FIGS. 4 and 5), if the posture is determined to be inappropriate considering the location (e.g., an obscene gesture), the recommendation may alert the individual and suggest a more appropriate gesture. In such an example, the analysis of the posture may include comparing the posture of the individual in the initial image with the postures of other individuals in other images taken at (or apparently taken at) the same location. The images used for comparison (in this particular example and/or any embodiments described herein) may include other images posted within the social media platform and/or images stored in another database (e.g., on the Internet, in a memory on a computing device, etc.). For example, a database storing examples of images that show postures that have been deemed to be inappropriate for that particular location may be accessed and searched. Similarly, recommended postures may be selected based on, for example, famous movies, celebrities, or photographs associated with the location.

The recommendation(s) may be provided to the appropriate individuals in any suitable manner, such as an electronic message (e.g., text message, email, etc.), an audio/voice notification, a pop-window, etc., which may be accessed/received/generated via any suitable electronic device (e.g., the camera that captured the image, a mobile device belonging to the respective individual(s), etc.).

Referring now to FIG. 5, an exemplary final (or second) image 500 is shown. As is apparent from comparing FIG. 5 to FIG. 4, the final image 500 has the same background and/or has been taken at the same location as the initial image 400 (FIG. 4) and still includes (or shows) individuals 402-408. However, it should be noted how the postures of the individuals 402-408 have changed significantly from those shown in FIG. 4 to the final (or second) postures shown in FIG. 5. In the particular example shown in FIG. 5, the final postures include having both hands raised, both arms pointed to the side, a side posture mimicking walking with hands in pockets, and a tilted posture with hands on hips. That is, in accordance with some aspects described herein, each of the individuals 402-408 have changed his/her posture based on, for example, the recommendation(s) provided.

In the depicted embodiment, all four of the individuals 402-408 have changed his/her posture (e.g., all four of the individuals 402-408 were provided with a recommendation regarding his/her posture). However, it should be understood that in some embodiments, only particular individuals in the image may receive such a recommendation (e.g., only registered users may be provided with a recommendation).

In some embodiments, after the appropriate recommendations have been provided and the posture(s) of the individual(s) suitably changed, the camera may automatically capture and store (or save) the image (i.e., the final image). For example, when the camera is appropriately directed (e.g., oriented in the same direction as was used to capture the initial image), the posture(s) of the individual(s) may again be analyzed to determine whether or not the postures have been changed in accordance with the recommendation(s) and/or are otherwise suitable. If the posture(s) are determined to be appropriate, the camera may automatically capture the final image 500.

However, in some embodiments, the capture of the final image 500 may be performed manually. For example, the user operating the camera may (also) receive the recommendations (e.g., via the camera or mobile device) and manually capture the final image 500 when he/she has determined that the postures of the individuals 402-408 have been appropriately changed. Further, in some embodiments, an "ignore" or "override" function may be provided such that the final image 500 may be captured and saved without the postures of the individuals 402-408 being changed (e.g., the recommendation(s) may be ignored).

Figure 6:
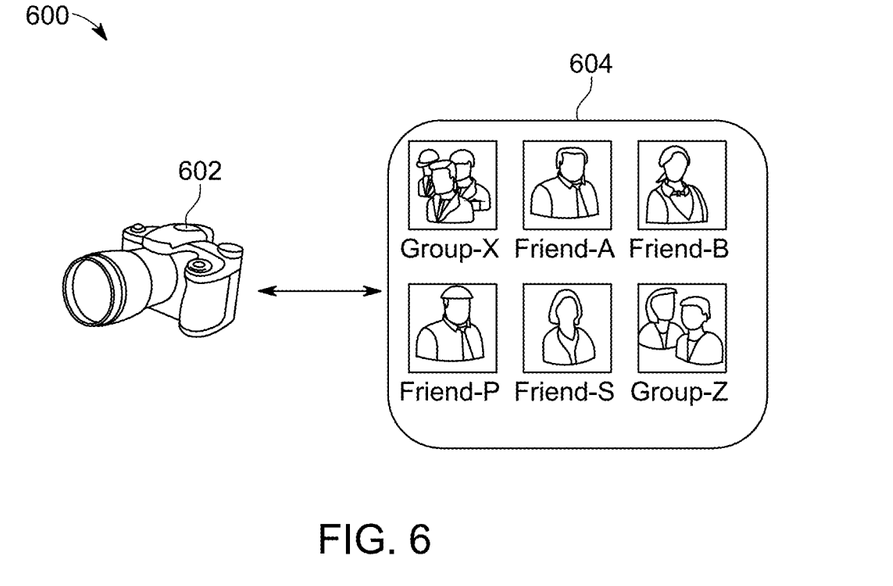
FIG. 6 is a simplified block diagram of a system for managing photographic capture, according to an embodiment of the present invention.

FIG. 6 illustrates a simplified block diagram of a system 600 for managing photographic capture according to some embodiments described herein. In particular, FIG. 6 illustrates a camera 602 and user information 604 that is received by and/or made accessible to the camera 602. As described above, the user information 604 may include, for example, information related to each of the registered users (or individuals) associated with the capture of a particular image (e.g., the registered users that appear in a particular image), such as various information associated with a social media platform profile (e.g., previous posts, images, connections, groups, etc.). The user information 604 may also include information related to the predicted use and/or distribution of the image to be captured. For example, one of more of the registered users may provide an indication of the contacts, groups, etc. within the social media platform with which he/she is planning on sharing the image, or alternatively, such a prediction may be determined automatically based on, for example, previously shared images.

Figure 7:
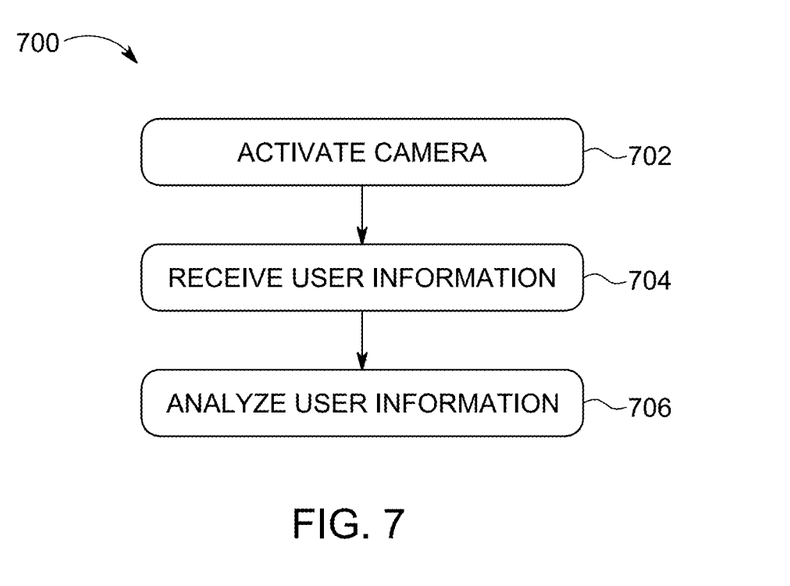
FIG. 7 is a flowchart diagram of a method for managing photographic capture, according to an embodiment of the present invention.

FIG. 7 is a flowchart diagram of a method 700 for managing photographic capture according to some embodiments described herein, which may be associated with the system 600 shown in FIG. 6. At block 702, the camera is activated (or turned "ON"). At block 704, the camera receives the user information (or registration(s) and/or the user information is made accessible to the camera). At block 706, the user information is analyzed, for example, in preparation of receiving images. For example, various images (e.g., associated with the user(s) and/or associated with groups to which the user(s) belong) may be fetched and analyzed for the postures of individuals appearing therein. As such, in some embodiments, the user information may be sent to/received by the camera (or other suitable electronic device) before the capturing of the initial image (described above).

Figure 8:
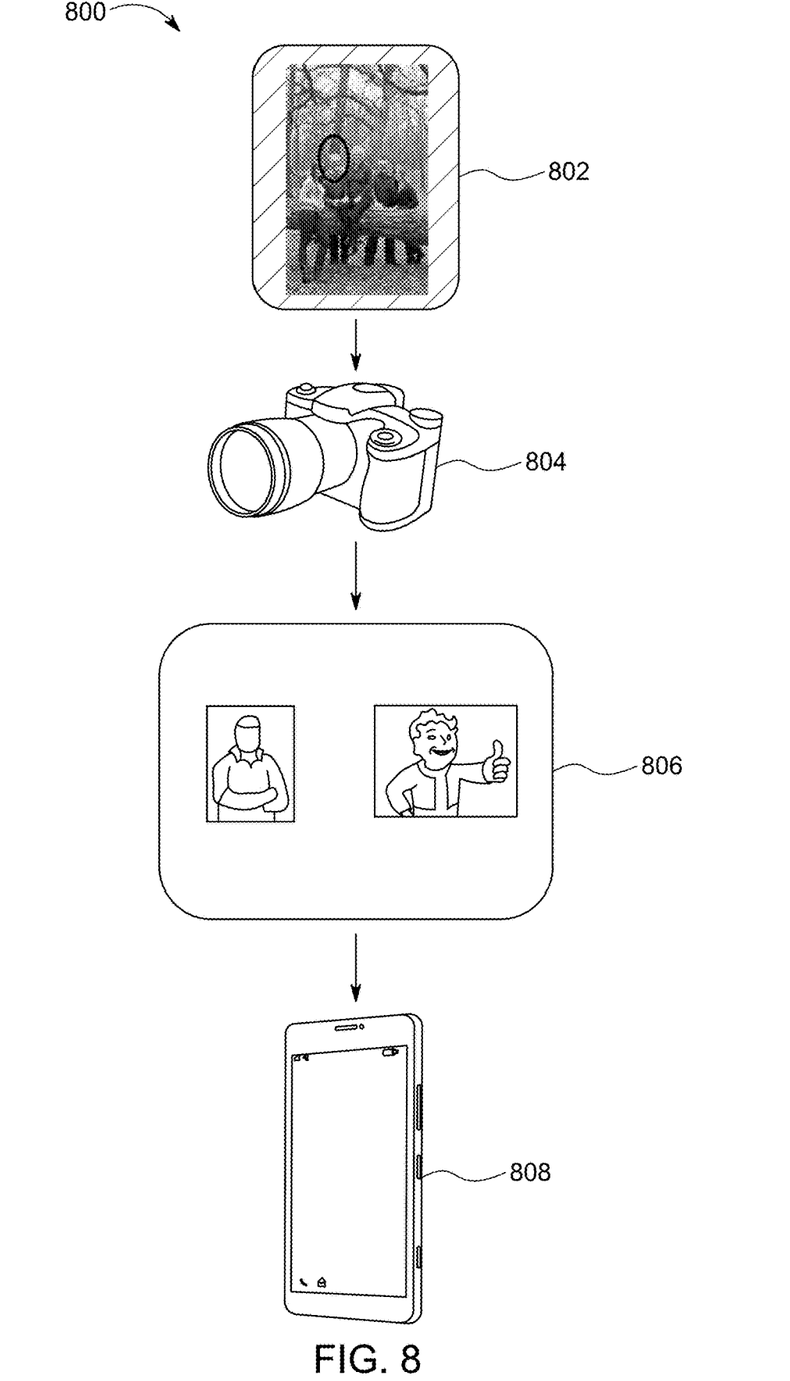
FIG. 8 is a simplified block diagram of a system for managing photographic capture, according to an embodiment of the present invention.

FIG. 8 is a block diagram of a system 800 for managing photographic capture according to some embodiments described herein. As shown, generally, an initial image 802 is captured by a camera 804. The camera 804 (and/or another computing device) analyzes posture(s) of the appropriate individuals in the initial image 802, and generates a recommendation 806 regarding the posture(s) of those individuals in the image. The recommendation 806 is sent/provided to the appropriate person (e.g., the individual associated with the recommendation, the operator of the camera 804, etc.) via an electronic device 808 (e.g., via text message, voice/audio message, email, pop-up window, etc.). In the depicted embodiment, the electronic device 808 is a cellular phone (e.g., belonging to one of the individuals in the image 802, the operator of the camera 804, etc.). However, it should be understood that the recommendation may (also) be sent to the camera 804.

Figure 9:
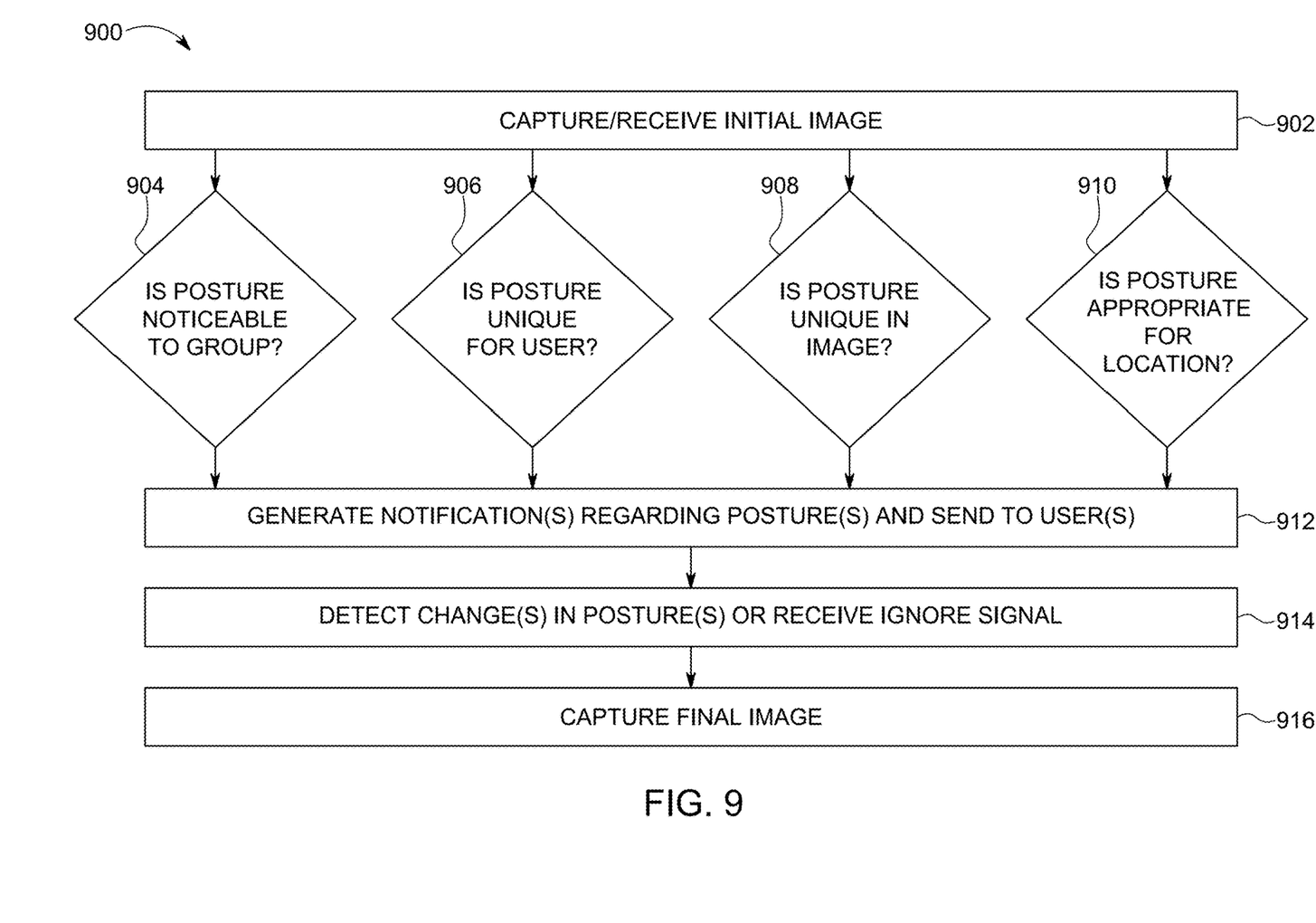
FIG. 9 is a flowchart diagram of a method for managing photographic capture, according to an embodiment of the present invention.

FIG. 9 is a flowchart diagram of a method 900 for managing photographic capture according to some embodiments described herein, which may be associated with the system 800 shown in FIG. 8. At block 902, an initial image is received (e.g., by a camera or another computing device).

At blocks 904-910, the posture of at least one individual in the initial image is analyzed, as described above. In the particular example shown in FIG. 9, at block 904, whether or not the respective individual (and/or the posture thereof) is generally noticeable to particular viewers (e.g., other users in a group with the individual) is determined. At block 906, whether or not the posture is unique for the user (e.g., as compared to the posture of the individual in other images) is determined. At block 908, whether or not the posture is unique within the image (e.g., as compared to the posture(s) of other individuals in the initial image) is determined. At block 910, whether or not the posture is appropriate for the location at which the image was captured is determined. As such, in some embodiments, the analysis of the posture of the individuals may be based on multiple factors, requirements, etc. (which may be selected by a user via system settings, preferences, etc.).

At block 912, after appropriate recommendations are created based on the analysis, a notification(s) (or signal) regarding the posture(s) are created and sent to the appropriate individual(s) in any suitable manner. As described above, the notifications may be provided via, for example, text messages, emails, pop-up windows, etc. on any suitable electronic device, including the camera (e.g., a mobile device including a camera), used to capture the initial image.

At block 914, appropriate changes to the posture(s) is detected (e.g., after the camera has been re-directed in an appropriate direction) or an ignore signal is received (e.g., the user of the camera may provide an indication that he/she will take the final image with the posture(s) as is). At block 916, the final image is captured (and/or saved) by the camera (e.g., automatically or manually).

Figure 10:
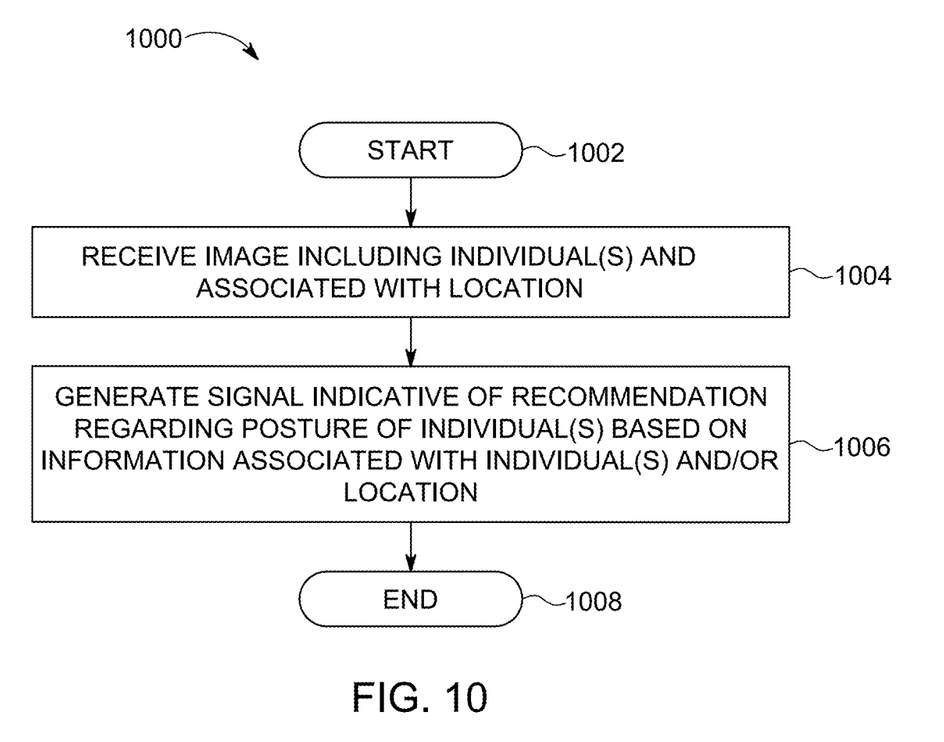
FIG. 10 is a flowchart diagram depicting an exemplary simplified method for managing photographic capture, in which various aspects of the present invention may be implemented.

Turning to FIG. 10, a flowchart diagram of an exemplary, simplified method 1000 for managing photographic capture, in accordance with various aspects of the present invention, is provided. Method 1000 begins (step 1002) with, for example, at least some individuals being registered as users in a system such as described herein. As described above, the registration may include joining a social media platform, such as a social network, in which individuals are connected and/or join groups.

An image (e.g., an initial image) is received (and/or captured by a camera) (step 1004). In some embodiments, the image includes (or shows) at least one individual (or person) and is associated with a location (e.g., is taken at a particular location). At least some of the individuals in the image may be registered as users as described above such that other images that include the individuals may be accessed (e.g., via the social media platform).

A signal indicative of a recommendation regarding a posture of at least one of the individuals in the image is generated (step 1006). The recommendation may be determined or generated based on information associated with the respective individual(s) and/or the location associated with the image. The recommendation may include a suggestion to change the posture of the at least one individual from a first posture to a second posture. The generating of the signal indicative of the recommendation may include comparing the posture of the at least one individual in the image to the postures of other individuals in other images associated with the location.

The recommendation may include a recommended posture for each of the plurality of individuals. The recommended posture for each of the plurality of individuals may be different than the recommended postures for the others of the plurality of individuals. The generating of the signal indicative of the recommendation may include determining a social nature of the at least one individual in the image based on the information associated with the at least one individual. The recommendation may include a recommended posture based on the determined social nature. The generating of the signal indicative of the recommendation may include comparing the posture of each of the plurality of individuals to the postures of the others of the plurality of individuals.

Method 1000 ends (step 1008) with, for example, a second (or final) image being captured after, for example, the generated recommendations with respect to the posture of the individual(s) in the image have been implemented (e.g., the individual's appropriate change in posture). In some embodiments, the second image is automatically taken upon detecting the appropriate change(s) in posture, while in other embodiments, a user may manually capture the second image with the camera after he/she has determined that the postures are suitable. In some embodiments, the user operating the camera may be provided with an option to ignore the recommendation(s) such that the second image may be taken without (all) of the recommended changes in posture being performed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing photographic capture, comprising:
   receiving an image, wherein the image includes at least one individual and is associated with a geographic location;
   generating a signal indicative of a recommendation with respect to a posture of the at least one individual in the image based on information associated with the at least one individual and the geographic location; wherein the information includes a first analysis, by the one or more processors, of postures of the same at least one individual in previously taken images; and a second analysis, by the one or more processors, comparing the posture of the at least one individual in the image to the postures of other individuals in other images previously taken at the geographic location as determined by Global Positioning System (GPS) information; and
   capturing and saving a final image subsequent to determining a change in the posture associated with the generated signal indicative of the recommendation.

2. The method of claim 1, wherein the recommendation includes a suggestion to change the posture of the at least one individual from a first posture to a second posture.

3. The method of claim 1, wherein the at least one individual comprises a plurality of individuals, and wherein the recommendation includes a recommended posture for each of the plurality of individuals.

4. The method of claim 3, wherein the recommended posture for each of the plurality of individuals is different than the recommended postures for the others of the plurality of individuals.

5. The method of claim 1, wherein the generating of the signal indicative of the recommendation includes determining a social nature of the at least one individual in the image based on the information associated with the at least one individual, and wherein the recommendation includes a recommended posture based on the determined social nature.

6. The method of claim 1, wherein the at least one individual comprises a plurality of individuals, and the generating of the signal indicative of the recommendation comprises comparing the posture of each of the plurality of individuals to the postures of the others of the plurality of individuals.

7. A system for managing photographic capture, comprising:
    at least one processor that
        receives an image, wherein the image includes at least one individual and is associated with a geographic location;
        generates a signal indicative of a recommendation with respect to a posture of the at least one individual in the image based on information associated with the at least one individual and the geographic location; wherein the information includes a first analysis, by the one or more processors, of postures of the same at least one individual in previously taken images; and a second analysis, by the one or more processors, comparing the posture of the at least one individual in the image to the postures of other individuals in other images previously taken at the geographic location as determined by Global Positioning System (GPS) information; and
        captures and saves a final image subsequent to determining a change in the posture associated with the generated signal indicative of the recommendation.

8. The system of claim 7, wherein the recommendation includes a suggestion to change the posture of the at least one individual from a first posture to a second posture.

9. The system of claim 7, wherein the at least one individual comprises a plurality of individuals, and wherein the recommendation includes a recommended posture for each of the plurality of individuals.

10. The system of claim 9, wherein the recommended posture for each of the plurality of individuals is different than the recommended postures for the others of the plurality of individuals.

11. The system of claim 7, wherein the generating of the signal indicative of the recommendation includes determining a social nature of the at least one individual in the image based on the information associated with the at least one individual, and wherein the recommendation includes a recommended posture based on the determined social nature.

12. The system of claim 7, wherein the at least one individual comprises a plurality of individuals, and the generating of the signal indicative of the recommendation comprises comparing the posture of each of the plurality of individuals to the postures of the others of the plurality of individuals.

13. A computer program product managing photographic capture by one or more processors, the computer program product comprising a non-transitory computer-readable storage medium having computer-readable program code portions stored therein, the computer-readable program code portions comprising:
    an executable portion that receives an image, wherein the image includes at least one individual and is associated with a geographic location;
    an executable portion that generates a signal indicative of a recommendation with respect to a posture of the at least one individual in the image based on information associated with the at least one individual and the geographic location; wherein the information includes a first analysis, by the one or more processors, of postures of the same at least one individual in previously taken images; and a second analysis, by the one or more processors, comparing the posture of the at least one individual in the image to the postures of other individuals in other images previously taken at the geographic location as determined by Global Positioning System (GPS) information; and
    an executable portion that captures and saves a final image subsequent to determining a change in the posture associated with the generated signal indicative of the recommendation.

14. The computer program product of claim 13, wherein the recommendation includes a suggestion to change the posture of the at least one individual from a first posture to a second posture.

15. The computer program product of claim 13, wherein the at least one individual comprises a plurality of individuals, and wherein the recommendation includes a recommended posture for each of the plurality of individuals.

16. The computer program product of claim 15, wherein the recommended posture for each of the plurality of individuals is different than the recommended postures for the others of the plurality of individuals.

17. The computer program product of claim 13, wherein the generating of the signal indicative of the recommendation includes determining a social nature of the at least one individual in the image based on the information associated with the at least one individual, and wherein the recommendation includes a recommended posture based on the determined social nature.

18. The computer program product of claim 13, wherein the at least one individual comprises a plurality of individuals, and the generating of the signal indicative of the recommendation comprises comparing the posture of each of the plurality of individuals to the postures of the others of the plurality of individuals.

* * * * *